Jan. 12, 1932.  B. LANGE  1,840,726
VARIABLE SPEED GEAR
Filed Oct. 18, 1929   2 Sheets-Sheet 1
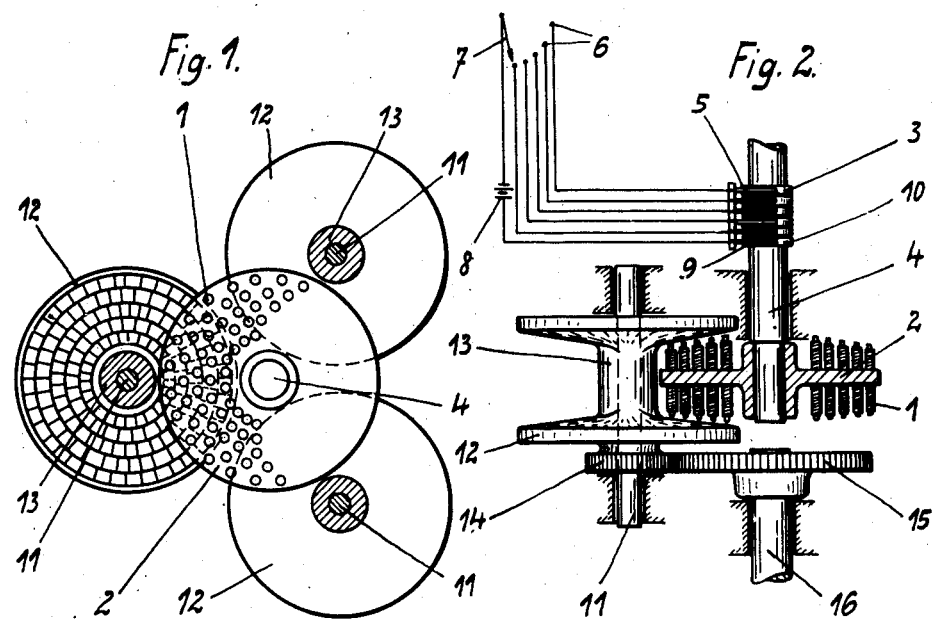
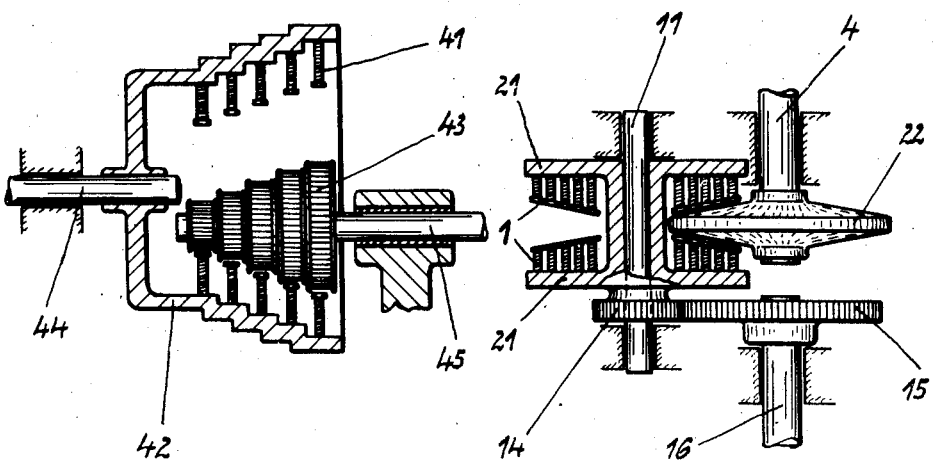
Inventor:
Bruno Lange Jan. 12, 1932.  B. LANGE  1,840,726
VARIABLE SPEED GEAR
Filed Oct. 18, 1929   2 Sheets-Sheet 2

Inventor:
Bruno Lange
By [signature]
Attorney.

Patented Jan. 12, 1932

1,840,726

UNITED STATES PATENT OFFICE

BRUNO LANGE, OF CHEMNITZ, GERMANY

VARIABLE SPEED GEAR

Application filed October 18, 1929, Serial No. 400,615, and in Germany November 25, 1928.

The present invention relates to an electromagnetic variable speed gear comprising at least two discs, a driving and a driven one, and mechanical energy, contrary to the method employed in variable speed gears of known type, is transmitted by means of electromagnetic lines of force. For this purpose one disc is provided with electromagnets and the other one with a grid of electrical conductors acting like a short-circuit rotor.

Figure 5:
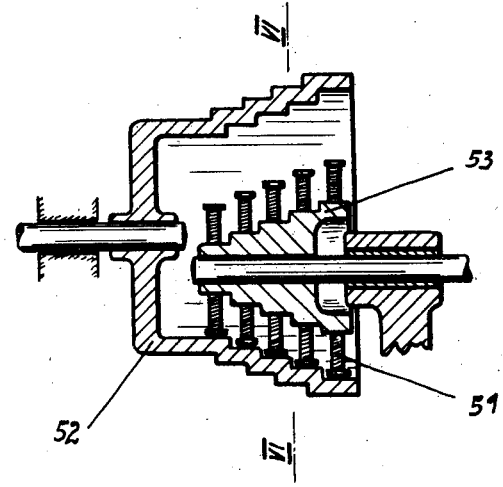
Figure 6:
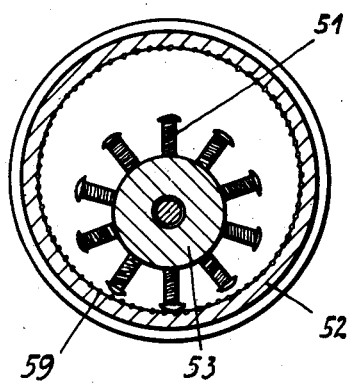
Figure 7:
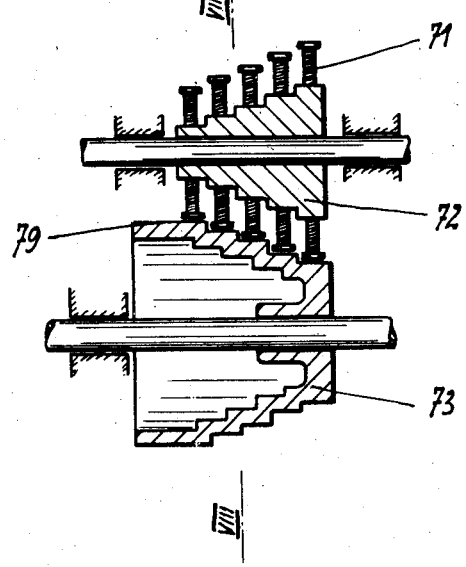
Figure 8:
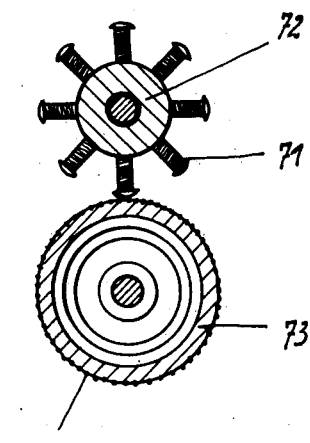

Several embodiments of the invention are illustrated in the accompanying drawings, in which Figure 1 is a view of a variable speed gear, in which a disc provided with electromagnets cooperates with three short circuit discs whose axes extend parallel to that of the first disc; Fig. 2 is a horizontal section of a gear similar to that of Fig. 1 with the magnets arranged on both sides of a disc; Fig. 3, a view of a gear similar to the one shown in Figs. 1 and 2, the magnets being, however, distributed over two discs and the short circuit disc adapted to be effective on both sides; Fig. 4, an axial section of a gear wherein the electromagnets are secured to the inside of a step pulley in radial position; Fig. 5, an axial section of a gear wherein the electromagnets are secured to the outside of a step pulley; Fig. 6, a cross section of the gear shown in Fig. 5; Fig. 7, an axial section of a gear wherein the electromagnets and the short circuit rotors are arranged on the outside of separate step pulleys; and Fig. 8 is a cross section of the gear shown in Fig. 7.

Referring to the drawings, the electromagnets 1, according to Figs. 1 and 2, are disposed on the two side surfaces of a disc 2 and in several circular lines around the axis of the latter. All magnets 1 positioned on such a circular line and thus forming a ring are connected to one of the contact rings 3 secured to the shaft 4 of the disc 2. Closely adjacent to each contact ring is a brush 5 supported by the machine frame and electrically connected to one of the contact knobs 6 of an electric switch. The rotary arm 7 of the latter, by means of an additional line and a suitable current source 8, is connected to a brush 9 resting also on a contact ring 10 of the shaft 4 which is connected with the free ends of all electromagnets 1. Therefore, if the arm 7 of the switch is adjusted to one of the contact knobs 6, a current flows from the source 8 through the switch 7 over the knob 6 to the brush 5 and the contact ring 3 touching it, thence through the coils of a ring of electromagnets to the ring 10 and back through the brush 9 to the current source 8. By turning the arm 7 past the contact knobs 6 the various rings of electromagnets can thus be switched on and off.

Within range of the rings of electromagnets three pairs of discs 12 are arranged near the disc 2 by means of the shafts 11, and the two dividing plates of each pair are rigidly interconnected by their hub 13. The sides of such a pair of discs facing each other are conical so that the electromagnets 1 positioned in various circles around the shaft 4 differ as to height, they being of such size that they are removed only a very small distance from the disc 12 concerned whenever they are nearest to one of the shafts 11. On the conical sides of the discs 12 electric conductor bars are disposed radially as indicated by the successive rings of radial lines in Fig. 1 on the disc 12 and interconnected at their free ends by short circuit rings indicated by concentric circles on the disk 12 of said figure so that the conductor bars and the short circuit rings form together a short circuit rotor. The radial conductor bars could extend from the hub 13 to the external edge of the disc 12, and it would be possible to provide either two or any desired number of short circuit rings on each disc 12. In the latter case the conductor bars need not be continuous, but several rings could be formed of correspondingly shortened bars and the latter spaced favorably in each ring. In this way each magnet ring is provided with a short circuit conductor system.

Upon each rotation of the disc 2 each electromagnet which is arranged near the outer edge of the disc 2, as soon as it comes into the vicinity of the disc 12, is moved over those short circuiting rods which are arranged near the outer edge of the disc 12. The short circuiting rods of the latter thereby move correspondingly rapidly below the path of the electromagnets, so that electric currents are produced in the short circuiting rods which correspond to the strength of the magnetic field, of the electromagnets in the region of the short circuiting rods. However, inasmuch as these electric currents are not produced by reason of the electromagnets, that is, the driving part, being moved over the short circuiting rods in the direction of motion of the latter, that is, concentrically or coaxially therewith but conversely by reason of the fact that the short circuiting rods, that is, the driven part, cross the path of the electromagnets, the electric currents thus induced also restrict the movement of the driven part.

Owing to the different height of the electromagnets 1 and the conical shape of the discs 12 only those electromagnets that happen to be between the shafts 4 and 11 can produce induced currents in the short circuit conductor system concerned after switching on a ring, while the magnets which are farther away from the connecting line of these shafts can produce only a small flux of magnetic force and a correspondingly small electrodynamic effect owing to the larger air space between them and the disc 12. This is a feature of special importance, because the more distant electromagnets are in this manner prevented from producing a braking effect which might become effective if all the electromagnets were of the same height and the short circuit conductor systems of the discs 12 were to form a level surface.

If no resistance is present, the switched-on ring of electromagnets will drive the discs 12 at the same speed as if a toothed gearing of corresponding pitch circle were operated in lieu of the electromagnets and the short circuit conductor system concerned. Corresponding to the load on the shaft the discs 12 actually drag slightly, but the efficiency of this type of gear is the higher the lesser the backlash is. For this reason it is necessary to switch on the ring of electromagnets best suited to the desired speed of the shafts 11.

The electromagnets may be of various shapes, the simplest way being to employ bar magnets and to arrange them between coils so that north and south poles alternate in each ring. However, horse shoe magnets can be used also, and it is generally advisable to provide the outer ends of the electromagnets with broad pole ends to facilitate the flux of the magnetic lines of force through the air.

Should the source 8 not be of the direct current type, the magnets must be composed of individual straps, wires or laminæ.

The gear can be shifted in the simplest manner possible merely by operating the arm 7 and without causing the least shock within the gear which runs perfectly smoothly and noiselessly. Further transport of energy transmitted in the manner described takes place by means of the gear 14 rigidly connected with one disc 12 and in mesh with a wheel 15 carried by a shaft 16 the axis of which extends in the same direction as that of shaft 4 so that the toothed wheel 15 is engaged by the wheels 14 of all three shafts 11.

The construction described may be altered in many ways, it being, for example, not necessary to place the electromagnets on the disc running between two other discs. As Fig. 3 shows, this disc may be secured to the insides of the double disc 21 and the short circuit conductor systems can be arranged on the conical side surfaces of a disc 22 moving between the discs 21. The control of the electromagnets by means of a switch 6, 7 and their connection to a suitable current source is, in this modification, exactly the same as explained in connection with Figs. 1 and 2.

Moreover, instead of disposing the electromagnets parallel to the axial directions of the shafts 4 and 11, they can be adjusted radially to the axis of their carrying disc.

In Fig. 4 the electromagnets 41 are, therefore, placed radially on the inside of a drum disc 42 arranged eccentrically relative to a step pulley 43, the steps of which are constructed as short circuit rotors in the known manner, and each of the latter is within range of a ring of electromagnets 41. The drum 42, by means of the shaft 44, and the step pulley 43, by means of its shaft 45, are rotatably positioned in the machine frame, and it depends on individual requirements of a given practical case whether the power is guided to the drum 42 or to the step pulley 43. The various rings of electromagnets 41, like the magnets 1 in Fig. 1, are connected to the contact knobs of a switch 6, 7 so that they can be successively switched on and off at will. The switched-on magnet ring produces within the coacting short circuit ring of the step pulley 43 electric currents which transmit the driving power electrodynamically from the drum 42 to the step pulley 43 or vice versa, according to the construction of the gear.

The construction shown in Fig. 4 can be readily reversed by securing the electromagnets to the outside of a cone pulley 53 (Fig. 5) and arranging the short circuit conductor systems on the inside of the drum 52, the working method being the same as that of the arrangement shown in Fig. 4. A sectional view of such a gear according to Fig. 6 indicates that in this modification the electromagnets remain during each rotation at a relatively wide angle within range of the short circuit conductor systems of the drum 52 so that the requisite catching power can be produced easily.

A very simple construction, according to Figs. 7 and 8, can be attained by positioning the electromagnets 71 as well as the short circuit conductor systems 79 on the outside of a drum 72 or 73. In this arrangement, too, the individual rings of electromagnets 71 may be connected successively and at will to a current source and thus brought into effect to transmit the driving force from the machine part 72 or 73 to either one of them according to design.

Having described my invention I expressly desire to make it known that the terms employed in the specification and claims annexed thereto do not limit the scope of the invention to the particular embodiments shown.

I claim:—

1. A variable speed gear comprising a plurality of series of electromagnets arranged concentrically on a common carrying disc, each series being arranged to be selectively energized from a common source of current, a short-circuited armature cooperating with said electromagnets, said short-circuited armature comprising a plurality of short-circuiting rods which lie upon a conical surface, the free ends of the electromagnets also being arranged upon a conical surface.

2. A variable speed gear comprising two groups of magnets each of said groups comprising a plurality of series of magnets, said series of each group being arranged concentrically with respect to one another, and a plurality of symmetrically constructed short-circuited armature conductors, said armature conductors being arranged to cooperate with the two respective groups of magnets.

3. A variable speed gear comprising a disc carrying a plurality of electromagnets in combination with a plurality of sets of short-circuited armature conductors, said disc and armature conductors being arranged on two different shafts, said magnet carrying disc being arranged to cooperate selectively with any set of said short-circuited armature conductors.

4. A variable speed gear comprising a disc, a plurality of concentrically arranged series of electromagnets carried by said disc, a shaft upon which said disc is arranged for rotation, a plurality of shafts, and a short-circuited armature on each of said plurality of shafts, said electromagnet disc being arranged to cooperate with all of said short-circuited armatures, and means for selectively energizing said series.

In testimony whereof I have affixed my signature.

BRUNO LANGE.